United States Patent
Sworn et al.

(10) Patent No.: US 11,447,174 B2
(45) Date of Patent: Sep. 20, 2022

(54) ELECTRICAL POWER ASSISTED STEERING SYSTEM

(75) Inventors: Tim Sworn, Birmingham (GB); George Dibben, Glenville (GB); Kannan Natesan, Rugby (GB); Birk Junghanns, Birmingham (GB)

(73) Assignee: ZF Automotive UK Limited

( * ) Notice: Subject to any disclaimer, the term of this patent is extended or adjusted under 35 U.S.C. 154(b) by 679 days.

(21) Appl. No.: 13/880,831

(22) PCT Filed: Oct. 13, 2011

(86) PCT No.: PCT/GB2011/051988
§ 371 (c)(1),
(2), (4) Date: Oct. 4, 2013

(87) PCT Pub. No.: WO2012/052744
PCT Pub. Date: Apr. 26, 2012

(65) Prior Publication Data
US 2014/0088835 A1   Mar. 27, 2014

(30) Foreign Application Priority Data

Oct. 22, 2010   (EP) ..................................... 1017893

(51) Int. Cl.
*B62D 5/04*    (2006.01)
(52) U.S. Cl.
CPC ......... *B62D 5/0466* (2013.01); *B62D 5/0463* (2013.01)
(58) Field of Classification Search
CPC ...... B62D 5/04; B62D 5/0466; B62D 5/0463; B62D 5/0472; B62D 15/025; B62D 6/008; B62D 6/00; B62D 7/1545; F02N 2200/0808; B60T 2220/03; G01S 2013/932; G05G 5/03; G05G 1/00; G01L 5/221
(Continued)

(56) References Cited

U.S. PATENT DOCUMENTS 5,257,828 A   11/1993  Miller et al.
5,508,919 A *  4/1996  Suzuki et al. .................. 701/41
(Continued)

FOREIGN PATENT DOCUMENTS

DE    10119968 A1   2/2002
EP     1170196 A2   1/2002
(Continued)

OTHER PUBLICATIONS

"Designing Lead and Lag Compensators", Aug. 29, 1996, https://www.ee.usyd.edu.au/tutorials_online/matlab/extras/lead.lag.html.*
(Continued)

*Primary Examiner* — Christian Chace
*Assistant Examiner* — Aaron C Smith
(74) *Attorney, Agent, or Firm* — Robert James Harwood

(57) ABSTRACT

An electric power assisted steering assembly comprises a steering mechanism which operatively connects a steering wheel to the roadwheels of a vehicle, a sensor adapted to produce a first output signal indicative of the torque carried by a portion of the steering mechanism and to produce a second output signal indicative, an electric motor, a signal processing unit having a lead-lag filter to produce an overall torque demand signal, and a motor drive stage adapted to provide a drive current to the motor responsive to the torque demand signal.

7 Claims, 4 Drawing Sheets

(58) Field of Classification Search
USPC .................. 701/42, 41; 318/675; 180/443
See application file for complete search history.

(56) References Cited

U.S. PATENT DOCUMENTS

| | | | |
|---|---|---|---|
| 5,919,241 | A | 7/1999 | Bolourchi et al. |
| 6,597,136 | B2 | 7/2003 | Burton et al. |
| 6,883,637 | B2 * | 4/2005 | Nishizaki et al. ............ 180/446 |
| 2003/0024759 | A1 | 2/2003 | Williams et al. |
| 2004/0140148 | A1 * | 7/2004 | Nishizaki ............. B62D 5/0463 180/443 |
| 2006/0012323 | A1 * | 1/2006 | Endo .................... B62D 5/0463 318/432 |
| 2010/0211262 | A1 | 8/2010 | Kushiro |
| 2010/0268418 | A1 * | 10/2010 | Fernandez .......... B62D 5/0466 701/41 |

FOREIGN PATENT DOCUMENTS

| | | |
|---|---|---|
| EP | 1211158 A2 | 6/2002 |
| EP | 1433689 A2 | 6/2004 |
| GB | 2369332 A | 5/2002 |
| JP | 2003306158 A | 10/2003 |
| WO | 2006099483 A1 | 9/2006 |
| WO | 2009030905 A1 | 3/2009 |

OTHER PUBLICATIONS

International Search Report for PCT/GB2011/051988 dated Mar. 7, 2012.
Patent Act 1977: Search Report under Section 17 from the Intellectual Property Office for Application No. GB1017893.7; date of search: Feb. 10, 2011.
G. Beale, Lag-Lead Compensator Design Using Bode Plots, George Mason University, Fairfax, Va, USA, 2003.

* cited by examiner

ELECTRICAL POWER ASSISTED STEERING SYSTEM

CROSS-REFERENCE TO RELATED APPLICATIONS

This application is a national stage of International Application No. PCT/GB2011/051988 filed Oct. 13, 2011, the disclosures of which are incorporated herein by reference in entirety, and which claimed priority to Great Britain Patent Application No. GB 1017893.7 filed Oct. 22, 2010, the disclosures of which are incorporated herein by reference in entirety.

BACKGROUND OF THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of an assistance torque demand signal that is indicative of the torque that is to be generated by an electric motor attached to the steering column. The motor applies a torque to the column of the same sense as that demanded by the driver and thus reduces the effort needed to turn the wheel.

A problem with this simple arrangement occurs in certain driving manoeuvres that excite a vehicle yaw mode transient response-leading to so-called "fish-tailing" of the vehicle. These manoeuvres are typically the result of "unsupported" driver actions on the handwheel such as rotational "flicks" where the driver applies a rapid handwheel angle change but does not follow it through with any substantial applied torque or perhaps releases the handwheel after initiating a rapid turn.

In such circumstances it is desirable that the handwheel returns to the central "straight-ahead" position quickly and with a minimum amount of overshoot or oscillation. In general, however, the typical vehicle plus EPS dynamic system is under damped in its free rotational response. This characteristic is commonly assessed by the application of a 'flick' or torque impulse to the steering wheel and the subjective rating of its subsequent rotational response. This rating is improved by greater accuracy and speed, and worsened by overshoot or oscillation in the steering wheel's return to centre.

U.S. Pat. No. 5,257,828 describes a control strategy to damp the free response of a vehicle plus EPS. The algorithm scales the rotational velocity of the steering column by a vehicle-speed dependent gain and subtracts this from the value it would otherwise have provided as an assistance torque demand signal, taking the form of a proportional controller on column velocity. The strategy therefore acts to resist the steering system's rotation in both free and forced modes. The level of the vehicle-speed dependent gain must therefore be carefully selected to provide sufficient free response damping without introducing a 'viscous' overly-damped steering feel in the forced mode.

In an alternative strategy disclosed in U.S. Pat. No. 5,919,241 (Delphi, 1999) a low pass filter with a corner frequency of around 2 Hz is applied to the column velocity signal before scaling it by a vehicle-speed dependent gain and subtracting the resulting damping torque demand from the assistance torque demand. The addition of the low pass filter significantly reduces the contribution of column velocity frequencies above the corner frequency to the damping torque demand. The bandwidth of the column velocity response is therefore increased, improving the steering wheel's speed of return to centre and reducing the 'viscous' feel to a forced driver input.

International patent application WO2009030905 adds a parallel path to the original "Linear" damping strategy, in which the square of the rotational velocity is scaled by a vehicle-speed dependent gain before being summed to the Linear damping torque demand. The damping torque demand's quadratic dependence on column velocity means that it provides little resistance to normal low speed steering inputs, but significantly more resistance to the rarer high speed steering inputs that typically trigger the worst return to centre behaviour. The function achieves a better trade-off between feel in the forced mode, and return to centre behaviour in the free mode as a result.

European patent 1211158 applies a high pass filter to scaled column velocity to create an "inertia-compensation" torque demand. The resultant torque is added to the assistance torque demand to improve steering feel by increasing high frequency assistance torque. The addition of the high pass filtered column velocity dependent term to assistance torque demand results in the increase of the bandwidth of column velocity response thereby improving the steering wheel's speed of return to centre and reducing the 'viscous' feel to a forced driver input.

BRIEF SUMMARY OF THE INVENTION

In accordance with a first aspect the invention provides an electric power assisted steering assembly comprising a steering mechanism which operatively connects a steering wheel to the roadwheels of a vehicle, a torque sensing means adapted to produce a first output signal indicative of the torque carried by a portion of the steering mechanism, a means for producing a second output signal indicative of the angular velocity of the portion of the steering mechanism, an electric motor operatively connected to the steering mechanism, a signal processing unit adapted to receive the two output signals and to produce therefrom an overall torque demand signal representative of a torque to be applied to the steering mechanism by the motor, and a motor drive stage adapted to provide a drive current to the motor responsive to the torque demand signal, and in that the overall torque demand signal includes a damping component that is dependent upon the second output signal, and characterised in that the means for producing the damping component includes a filter having one pole and one zero, and in that the second signal is passed through the filter to produce the damping component, the frequency of the pole and zero being selected such that the filter provides a band between the pole and zero within which there is additional phase lag or lead between the second signal and output of the filter compared to the constant phase offset between the second signal and the filter output beyond this band.

The steering system therefore includes a damping component which is derived from a column velocity signal that has passed through a filter commonly referred to as a "lead-lag" filter. The applicant has appreciated that the use of such a combination filter offers considerable benefit over the prior art use of low pass filters or high pass filters. The damping component may provide a damping component. As is known, each lead or lag filter within the lead-lag filter can itself be expressed in the following form:

$$\frac{K(S+\omega 1)}{(S+\omega 0)}$$

Where K is a fixed gain term and ω1 and ω0 are the corner frequencies of the pole and zero respectively.

The corner frequency of the pole may be higher than the corner frequency of the zero. This provides an additional phase lead in the frequency band between the pole and zero.

Alternatively, the corner frequency of the pole may be lower than the corner frequency of the zero.

The gain term K may be fixed in value, or may be dependent on a parameter of the vehicle behaviour, such as vehicle speed.

The filter may be arranged such that the ratio of the gains of the filtered second output signal to the second output signal is higher at frequencies above the pole/zero frequency than between the pole/zero frequency.

Alternatively the filter may provide a gain which is lower above the pole/zero frequency than between the pole/zero frequency.

The lead-lag filter may receive as an input a term dependent of the square of the velocity of the column, a so called quadratic term. This may be in addition to receiving as an input a term that is a linear function of the column velocity.

The overall torque demand signal may include an assistance torque component that is dependent upon the value of the first output signal indicative of the torque demanded by the driver of the vehicle. This may be added to the damping signal, or the damping signal may be subtracted from the assistance torque signal. Whether the combination is additive or subtractive will vary from system to system but overall the damping component should reduce the magnitude of the overall torque demand signal.

According to a second aspect there is provided a method of producing a damping component for use in an electric power assisted steering system, the method comprising the steps of: generating a first column velocity term which comprises a product of the column velocity and a first scaling function; and producing a damping torque component that is dependent upon the first column velocity term; characterised in that the step of producing the damping torque includes passing the first column velocity term through a lead-lag filter having one pole and one zero.

The method may further comprise the steps of generating a second column velocity term that comprises a product of the square of the column velocity, or a higher order factor, and a second scaling function, and the step of producing a damping torque component may comprise producing a component that is dependent upon the sum of the first and second column velocity terms.

The features of the apparatus of the first aspect of the invention may be incorporated into the second aspect of the invention. For instance the filter used may have a pole with a higher corner frequency than the corner frequency of the zero, or the corner frequency of the pole may be lower than that of the zero.

The method may additionally comprise generating further damping components which may be combined with the first damping component. It may also comprise generating an assistance torque component that may be combined with the damping components to provide an overall torque demand value.

Other advantages of this invention will become apparent to those skilled in the art from the following detailed description of the preferred embodiments, when read in light of the accompanying drawings.

DETAILED DESCRIPTION OF THE INVENTION

Figure 1:
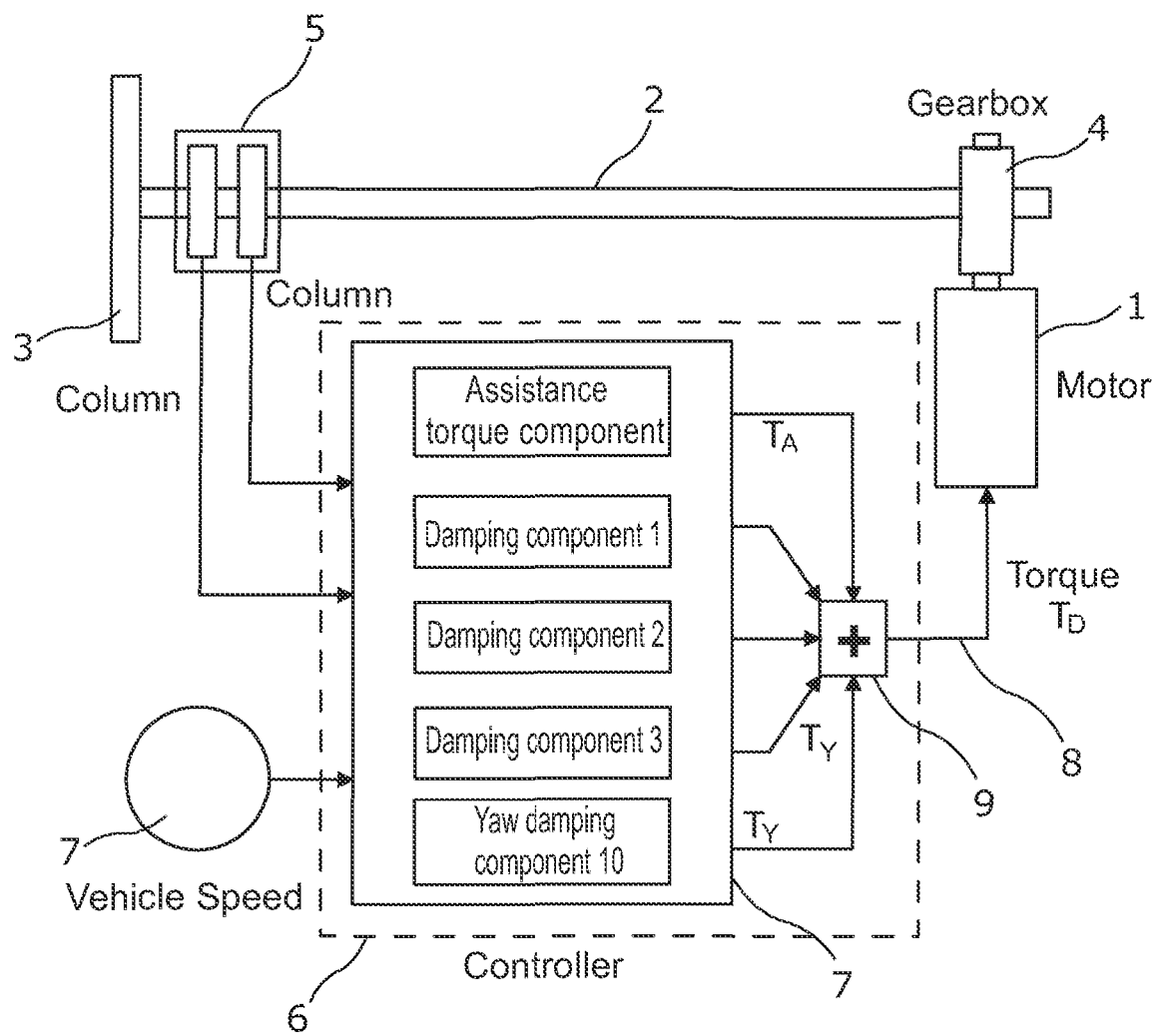
FIG. 1 is a schematic diagram of a first embodiment of an electric power assisted steering system in accordance with the present invention.

A typical electric power assisted steering system is illustrated in FIG. 1 of the accompanying drawings. The system comprises an electric motor 1 which acts upon a portion of a steering column 2 through an (optional) gearbox 4. The electric motor 1 may act upon a different part of a steering gear such as a rack and pinion that connects the steering column to the road wheels. The steering column is connected at one end to a steering wheel 3 which can be turned by a driver to turn the road wheels and hence steer the vehicle. Of course, this is not to be taken as limiting to the scope of protection we are seeking, and other power assisted steering systems are envisaged to which the invention has application.

The steering column 2 carries a multiple output sensor 5 that is adapted to measure the torque carried by the steering column 2 that is produced by the driver of the vehicle as the steering wheel (not shown) and hence steering column is turned against the resisting force provided by the vehicles road wheels (also not shown). An output signal T indicative of torque is fed from the sensor 5 to a first input of a controller 6 shown in dashed lines which includes a signal processing unit 7.

The multiple output sensor 5 also produces a measurement of the angular velocity Ncol of the steering column shaft. As shown in FIG. 1 this is an integral part of the torque sensor 5 but could be a separate device. The output Ncol is fed to a second input of the controller 6.

Furthermore an optional vehicle speed sensor 8 is provided which produces an output signal U indicative of the speed of the vehicle, which is fed to a third input of the controller 6.

In total three input values are passed to the signal processing unit: column velocity Ncol, vehicle speed U and column torque T.

The controller 6 acts upon the three signals it receives to produce, as its output, a torque demand signal TD at output node 8 that is passed to a motor drive stage (not shown). The motor drive stage converts the torque demand signal into drive currents for the electric motor 1.

To produce the overall torque demand signal TD that is fed to the motor drive stage the processing unit typically includes a number of algorithms or components, each of which produces a respective torque demand component. Some of these components are assistance torque components, and represent torque which helps the drive to turn the wheel (i.e. working in the same sense as the torque demand made by the driver). Others are damping components, which act to reduce the level of torque demand produced to provide improved steering feel, or to assist in mimicking the behaviour of a hydraulic steering system, or perhaps to compensate for unwanted steering effects or control unwanted vehicle dynamic behaviour. These components are combined in an adder block 9 to produce the overall torque demand signal TD, although they could be combined in other ways, perhaps subtracting one from another.

The value of the overall torque demand signal TD corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

A first one of the components produced by the signal processing means is an assistance torque component TA which has a value that depends on the amount of torque a driver is applying to the steering column through the wheel. One of the remaining components in particular is a damping component 10 which is intend to damp the vehicle response during a flick manoeuvre.

The assistance torque signal TA is derived as a function of the torque in the steering column as measured by the torque sensor 5. This is well known in the art and so will not be described in detail here. The relationship between the measured torque and the assistance signal is essentially linear. However, other possible relationships may be used to map the torque to the assistance signal. In both cases, as torque increases the magnitude of the assistance signal increases.

Figure 2:
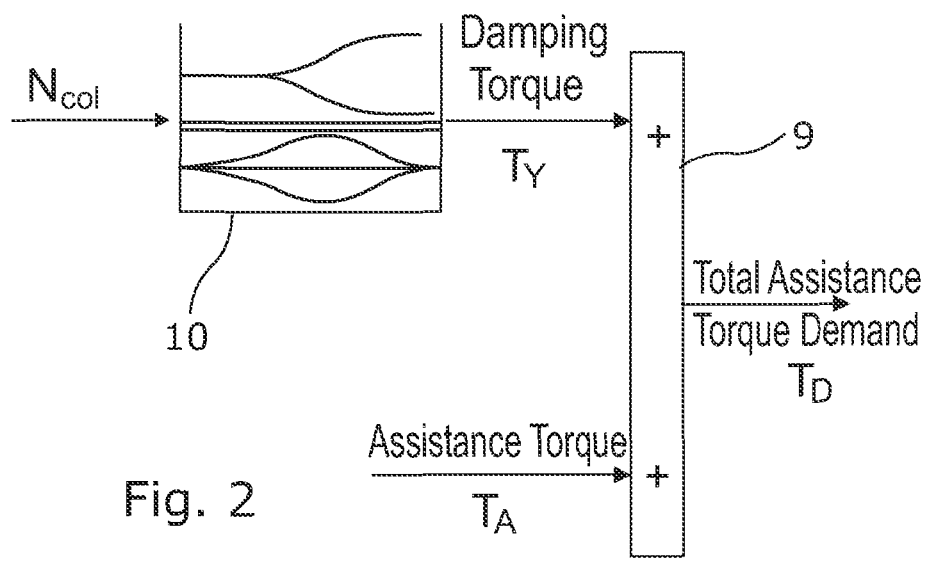
FIG. 2 is a block diagram illustrating the transfer function of the linear damping component of FIG. 1.

The damping component TY is essentially a function of column velocity, and is produced by passing the column velocity signal through a filter having a single pole and a single zero. Such a filter is known as a lead or lag filter. This is shown in schematic form in FIG. 2 of the accompanying drawings. This component is subtracted from the assistance torque signal, (although they could be added together) so that the overall torque demand signal TD is lower in value at increased steering column velocities.

Figure 3:
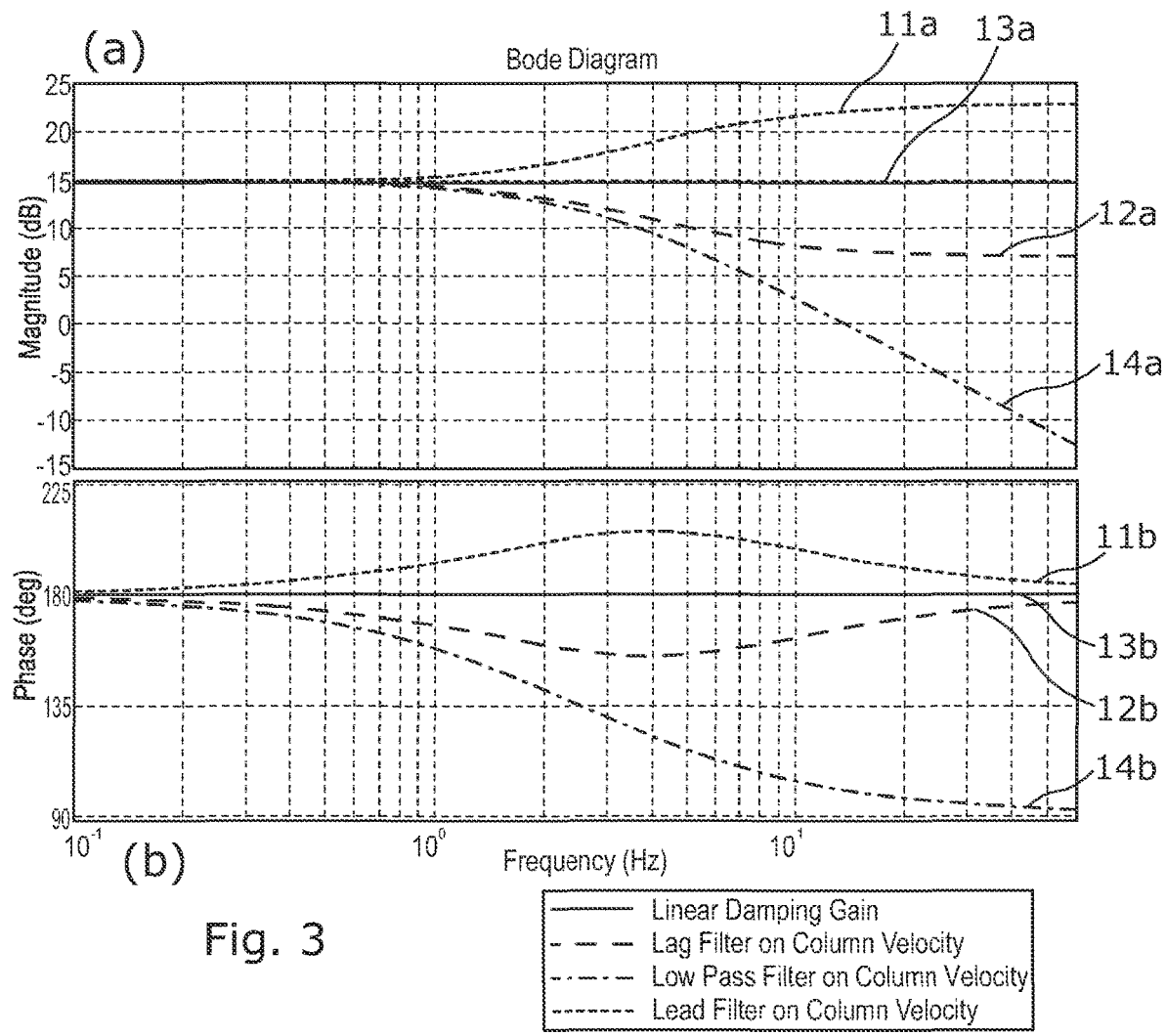
FIG. 3 (a) is a bode diagram for the linear damping component of FIG. 1 plotting frequency against Magnitude, and (b) frequency against phase.
Figure 4:
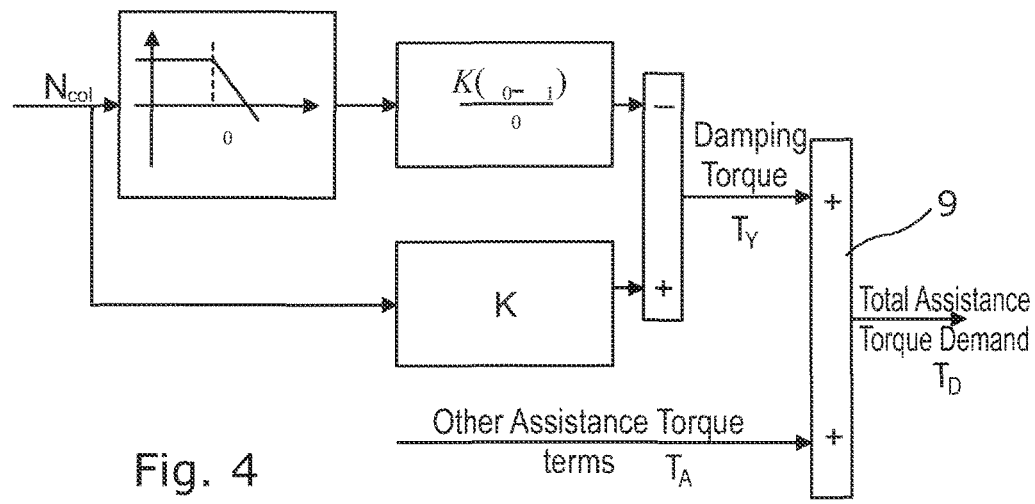
FIG. 4 is an equivalent circuit representation of the damping component.
Figure 5:
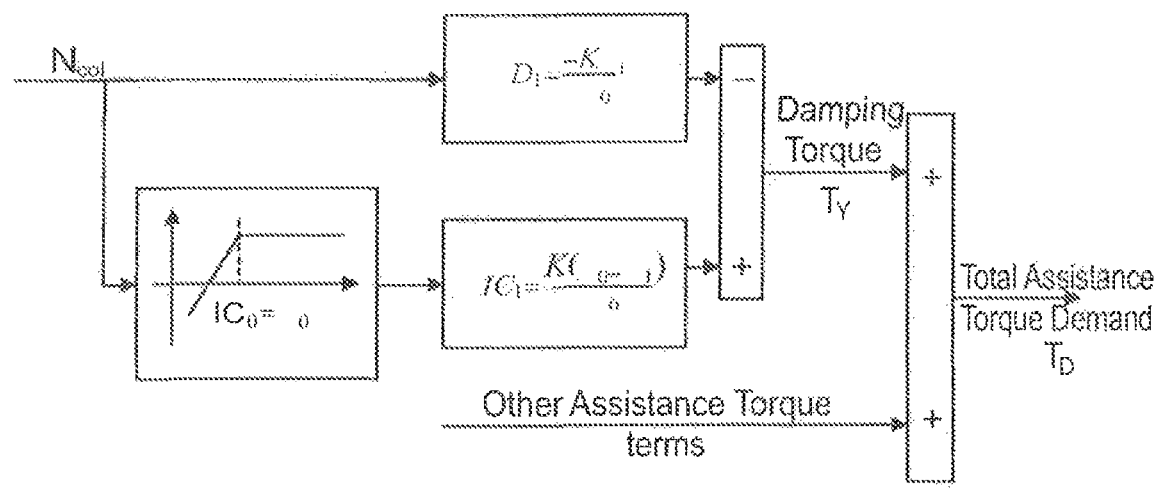
FIG. 5 is an alternative equivalent circuit representation of the damping component of FIG. 1.

FIG. 3 is a bode plot of frequency against magnitude and phase of the damping component relative to the input of the lead-lag filter. One trace 11 *a*, 11 *b* corresponds to a filter in which the pole corner frequency is higher than the zero corner frequency (a lead filter). Another trace 12 *a*, 12 *b* corresponds to a filter in which the pole corner frequency is lower than the zero corner frequency (a lag filter). For reference, a trace 13 *a*, 13 *b* corresponding to the linear damping gain without filtering, and the use of a simple low pass filter 14 *a*, 14 *b* are also shown. In the proposed scheme, the column velocity is passed through a filter composed of one zero and one pole to create a damping torque demand. The corner frequencies of the filter and its dc gain could be tuned as a function of vehicle speed. The damping torque is then added to (or could be subtracted from) the assistance torque demand to give total assistance torque demand.

The lead filter or lag filter in the lead-lag filter can itself be expressed in the following form:

$$\frac{K(S+\omega 1)}{(S+\omega 0)}$$

A lag filter is obtained by setting ω0 lesser than ω1 while a lead filter is obtained by setting ω0 greater than ω1. One advantage of generating a damping torque demand by applying a lead-lag filter to the column velocity input in place of a linear damping gain (U.S. Pat. No. 5,257,828) or low pass filter (U.S. Pat. No. 5,919,241) is that the level of damping at lower and higher frequencies can be controlled independently. The apparatus therefore provides greater control over the steering feel and free response behaviour than the prior art. For example if following the application of a 'flick' to the steering wheel, the driver desires a free response that has a fast return to centre and good damping of subsequent low frequency oscillations, a lag filter is superior to the linear damping gain and low pass filter methods.

A linear damping gain introduces constant damping across all frequencies. This means that there is no independent control over low and high frequency damping of the column velocity. As a result, the damping torque opposes the assistance torque demand at all frequencies. For a 'flick test' response that quickly returns to centre with minimum overshoot and subsequent oscillation, the damping torque should offer lower resistance at higher frequency than at lower frequency. In other words, the damping of the high frequency oscillatory mode should be reduced in comparison to the linear damping gain. A low pass filter has a constant roll-off at high frequencies and thus offers faster initial response during a flick test than a purely linear damping gain. The higher phase lag of the low pass filter however, lowers the damping at low frequency.

With a lag filter, it is possible to reduce the magnitude of the low frequency phase lag as compared to a low pass filter with the same corner frequency, but still allow fast initial response by decreasing high frequency gain. This comparison is illustrated in FIG. 3.

If the driver desires a slow return to centre and good damping of subsequent low frequency oscillation, a lead filter is superior to a linear damping gain or low pass filter. The reason for better damping is the higher magnitude and phase lead as shown in FIG. 3. The bandwidth of the column velocity is reduced as well as a result. In terms of 'flick' test, such a filter would decrease the damping of all resonant modes and hence, the return of the steering wheel would be slow after the initial flick and the subsequent low frequency oscillations would die out fast.

The lead-lag filters can be reformulated as in 4 and equivalently as in 5. The scheme in 5 is produces a damping component TY comprising a first component D1 which is a linear damping gain on column velocity and a second component IC1 which is an inertia compensation gain on high pass filtered column velocity.

The transfer function from column velocity to Damping Torque is as follows:

Since the corner frequencies ω0 and ω1 of the lead and lag filters can be tuned based on the values of the filter coefficients, the low and high frequency response of the column velocity can be independently controlled. This offers improved steering feel and time response, effectively combining inertia compensation and damping in a single damping component.

Figure 6:
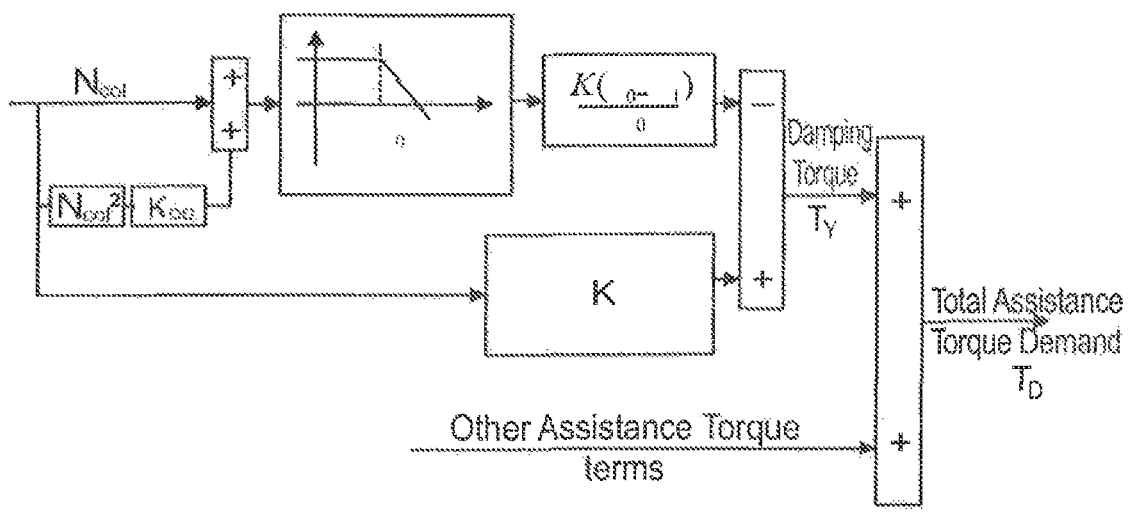
FIG. 6 is a block diagram of a second embodiment of an electric power assisted steering system according to the present invention.

FIG. 6 shows a modification in which the damping component TY is dependent on a quadratic value of the column velocity. Summing the quadratic term with linear term before passing through the filter leads to the configuration in FIG. 6. This configuration offers the advantage of independently controlling the scaling of low and high magnitude column velocities. The effect of this is to add a low pass filtered quadratic damping term, which further damps the low frequency high magnitude column velocity oscillations.

Figure 7:
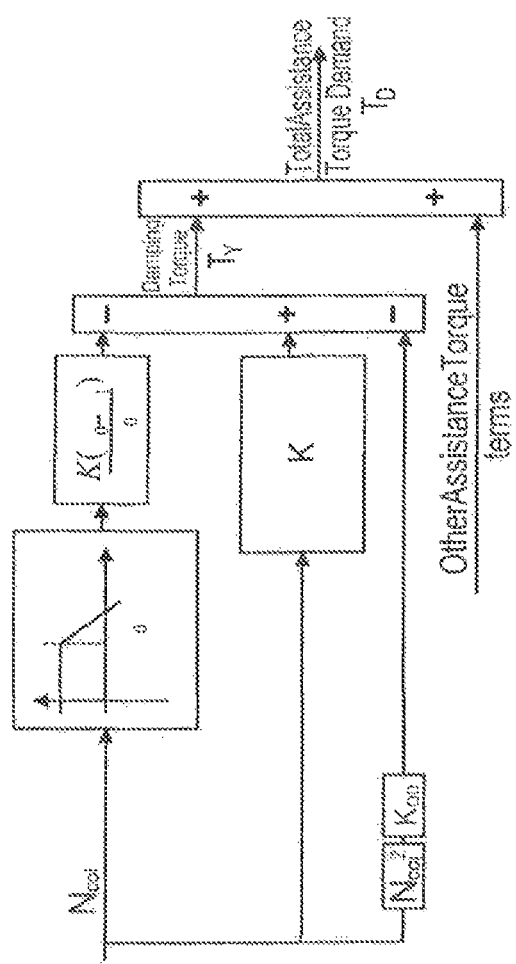
FIG. 7 is a schematic of a third embodiment of an electric power assisted steering system according to the present invention.

Another variant on the configuration in FIG. 6 is the addition of the unfiltered quadratic damping term as shown in FIG. 7. The effect of adding an unfiltered quadratic damping term is to increase the damping of high magnitude oscillations across all frequencies.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electric power assisted steering assembly comprising:
   a steering mechanism which operatively connects a steering wheel to roadwheels of a vehicle;
   a first sensor adapted to produce a first output signal indicative of a torque carried by a portion of the steering mechanism;
   a second sensor adapted to produce a second output signal indicative of an angular velocity of the portion of the steering mechanism, wherein the first and second sensors are one of implemented in a single sensor device or as separate sensor devices;
   a speed sensor adapted to produce a third output signal indicative of a speed of the vehicle;
   an electric motor operatively connected to the steering mechanism;
   a signal processing unit being configured to:
      receive the first, second, and third output signals;
      produce an assistance torque component based on the first output signal;
      apply the second output signal to a filter to produce a damping component equivalent to a filtered first column velocity signal, wherein the filter comprises a gain term constant, a pole and a zero, the gain term constant is set based on the speed of the vehicle, and wherein one of a corner frequency of the pole is set greater than a corner frequency of the zero so that the filter functions as a lag filter or the corner frequency of the zero is set greater than the corner frequency of the pole so that the filter functions as a lead filter;
      determine an overall torque demand representative of a torque to be a applied to the steering mechanism by the motor by subtracting the damping component from the assistance torque component; and
   a motor drive stage adapted to provide a drive current to the electric motor based on the determined overall torque demand.

2. The electric power assisted steering assembly according to claim 1 in which the filter is in the form:

$$\frac{K(s+\omega_1)}{(s+\omega_0)},$$

wherein $\omega_1$ and $\omega_0$ are the corner frequencies of the pole and zero respectively and a gain term K is based on vehicle speed.

3. The electric power assisted steering assembly according to claim 1 in which the linear function is configured to calculate a square of the angular velocity of the portion of the steering mechanism.

4. A method of producing a damping component for use in an electric power assisted steering system, the method comprising the steps of:
   receiving an output signal indicative of a torque carried by a portion of a steering mechanism that operatively connects a steering wheel to roadwheels of a vehicle;
   receiving a second output signal indicative of an angular velocity of the portion of the steering mechanism;
   receiving a speed signal generated by a speed sensor indicative of a speed of the vehicle;
   producing an assistance torque component based on the first output signal;
   applying the second output signal to a filter to produce the damping component, wherein the filter comprises a gain term constant, a pole and a zero, the gain term constant is set based on the speed of the vehicle, and wherein one of a corner frequency of the pole is set greater than a corner frequency of the zero so that the filter functions as a lag filter or the corner frequency of the zero is set greater than the corner frequency of the pole so that the filter functions as a lead filter;
   subtracting the damping component from the assistance torque component to produce an overall torque demand; and
   applying an overall torque demand signal representative of the overall torque demand to the steering mechanism, wherein the overall torque demand signal is applied by a motor.

5. The method according to claim 4 which further comprises the steps of:
   generating via the filter a first column velocity term that comprises a product of the angular velocity and a first scaling function;
   generating via the filter a second column velocity term that comprises a product of a square of the angular velocity and a second scaling function; and
   producing the damping component based on a sum of the first and second column velocity terms.

6. The method according to claim 4 in which a signal processing unit produces the damping component.

7. The method according to claim 4 in which the angular velocity is measured by a sensor.

* * * * *